United States Patent
Brosche

(10) Patent No.: US 6,611,759 B2
(45) Date of Patent: Aug. 26, 2003

(54) METHOD AND DEVICE FOR DETECTING AND EVALUATING OBJECTS IN THE VICINITY OF A MOTOR VEHICLE

(75) Inventor: Thomas Brosche, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,278

(22) PCT Filed: Dec. 1, 2000

(86) PCT No.: PCT/DE00/04275
§ 371 (c)(1),
(2), (4) Date: Dec. 7, 2001

(87) PCT Pub. No.: WO01/48512
PCT Pub. Date: Jul. 5, 2001

(65) Prior Publication Data
US 2003/0036850 A1 Feb. 20, 2003

(30) Foreign Application Priority Data
Dec. 24, 1999 (DE) .......................... 199 63 006

(51) Int. Cl.$^7$ ............... G01S 13/00; G01S 7/28; G01C 21/00
(52) U.S. Cl. ............... 701/301; 701/96; 340/436; 342/70
(58) Field of Search ............... 701/1, 301, 96, 701/207; 340/815.69, 988, 903, 436; 342/70, 455, 458

(56) References Cited

U.S. PATENT DOCUMENTS

| 3,691,559 | A | * | 9/1972 | Jackson | 343/112 D |
| 4,143,370 | A | * | 3/1979 | Yamanaka et al. | 343/7 VM |
| 4,349,823 | A | * | 9/1982 | Tagami et al. | 343/7 VM |
| 5,933,109 | A | * | 8/1999 | Tohya et al. | 342/175 |
| 5,977,905 | A | | 11/1999 | Le Chevalier | 342/163 |
| 6,226,571 | B1 | * | 5/2001 | Kai | 701/1 |
| 6,327,530 | B1 | * | 12/2001 | Nishimura et al. | 701/96 |
| 6,429,789 | B1 | * | 8/2002 | Kiridena et al. | 340/905 |

FOREIGN PATENT DOCUMENTS

| DE | 44 42 189 | 5/1996 |
| EP | 0 685 930 | 12/1995 |
| WO | WO 98 00728 | 1/1998 |

OTHER PUBLICATIONS

A. Ludloff, Handbuch Radar und Radarsignalverarbeitung, pp. 2–21 to 2–44, Vieweg Verlag, 1993. Month is not available.

* cited by examiner

Primary Examiner—Tan Q. Nguyen
Assistant Examiner—Dalena Tran
(74) Attorney, Agent, or Firm—Kenyon & Kenyon

(57) ABSTRACT

A method and a device for acquiring and evaluating objects in the area surrounding a vehicle, in which, using at least one radar sensor, the target objects in a monitoring area are acquired, and in at least one evaluation unit the distance data and/or velocity data of the target objects are evaluated. The acquisition of the target objects takes place within a virtual barrier that can be modified in its distance from the vehicle and in its length, and, using a transmission signal of a pulse radar sensor, the receive signal reflected from the target object can be evaluated in one or more receive channels so that different locus resolutions and different dimensions with respect to the distance and the length of the virtual barrier can be achieved.

22 Claims, 2 Drawing Sheets

METHOD AND DEVICE FOR DETECTING AND EVALUATING OBJECTS IN THE VICINITY OF A MOTOR VEHICLE

FIELD OF THE INVENTION

The present invention relates to a method and to a device for acquiring and evaluating objects in the area surrounding a vehicle using a radar sensor.

BACKGROUND INFORMATION

German Published Patent Application No. 44 42 189 discusses a system for providing distance measurement in the area surrounding motor vehicles using sensors having transceiver units for the simultaneous transmission and reception of information. With the aid of the distance measurement, passive protective measures for the vehicle can be activated, for example in case of a front, side, or rear collision. With an exchange of the acquired information, a judgement of traffic situations can be carried out for the activation of corresponding triggering systems.

In addition, a distance measurement can be carried out or performed using what is known as a pulse radar system, in which a pulse carrier is sent out having a rectangular envelope of an electromagnetic oscillation, e.g. in the gigahertz range. This pulse carrier is reflected at the target object, and from the time from the transmission of the impulse and the impinging of the reflected radiation, it is possible to easily determine the distance to the goal, and (with limitations), using the Doppler effect, the relative speed of the target object as well. Such a measurement design is, for example, discussed in the textbook by A. Ludloff, "Handbuch Radar and Radarsignalverarbeitung," pages 2–21 to 2–44, Vieweg Verlag, 1993.

The design of such a known radar sensor is constructed in such a way that the radar pulses reflected at the respective target object travel to a receiver via antennas, and there they are mixed with the time-delayed pulses provided by the pulse production system. After a low-pass filtering and analog/digital conversion, the output signals of the receiver are supplied to an evaluation unit.

To control reliably the above-mentioned passenger protection systems in a motor vehicle, a multiplicity of radar sensors may be required for the individual conflict situations in the area surrounding the motor vehicle. For example, a collision early-recognition (pre-crash recognition) system enables an early acquisition of an object that represents a danger for the vehicle occupants in case of a collision. In this manner, protective systems, such as an airbag, seat-belt tensioner, or side airbag, may be activated at the proper time to achieve the greatest protective effect.

For proper triggering of these safety systems in the motor vehicle, knowledge of the relative velocity (speed) between the motor vehicle and one or more targets (e.g., vehicles traveling ahead or other obstacles) before and during an anticipated collision, and of the expected time of the collision, may be of great importance.

Using a radar sensor of the type mentioned above, methods can be carried out or performed, for example, using a pulse radar sensor or what is known as an FMCW radar sensor, that enable an acquisition and evaluation of the relative velocity. Such an FMCW radar device is discussed in European Patent Application No. 0 685 930.

For example, at successive times, distance values can be measured and differentiated with respect to time. In this way, one obtains the values for the instantaneous relative velocity between the target and the radar sensor. Through a double differentiation of the distance values, the values for the acceleration relative to the target may be obtained. Using a different method, the difference between the transmitted oscillator frequency of the radar sensor and the frequency of the signal reflected and received from the target can be produced, and what is referred to as the Doppler frequency can be evaluated.

From the values measured in this way, the time until the collision, and, with the use of a plurality of spatially distributed sensors, the components orthogonal to the front of the vehicle of the relative velocity or acceleration, and the location of the collision, may be calculated. Using the instantaneous values of the acceleration, the corresponding values for the time of the collision can then be extrapolated.

In this context, a high degree of measurement precision may be important, in particular given targets having a low reflection cross-section and given high disturbing signal portions in the velocity range that is to be evaluated for the respective application (e.g., triggering of the seat-belt tensioner or changing over of the stages of the airbag). Here, previous measurement methods are based on a constant length of the acquisition area (region) in the area being monitored, and/or a constant distance from this area to the radar sensor.

SUMMARY OF THE INVENTION

An exemplary method and device for acquiring and evaluating objects in the area surrounding a vehicle using a radar sensor of the type indicated above may be advantageously provided in that in a monitoring area (monitored area or monitored region), the acquisition of the target object takes place within a virtual barrier, known as a "range gate," that can be modified in its distance from the vehicle and in its length.

After an evaluation of the targets acquired using a radar sensor with respect to their potential risk, the distance and the velocity, as well as, if necessary, the acceleration relative to the target object are measured. Using the adaptive construction of the dimensions of the virtual barrier according to the present invention, the measurement process may be advantageously optimized with respect to measurement precision, locus resolution, and the signal/noise ratio.

In an exemplary method according to the present invention, using a transmission signal of a pulse radar sensor, the received signal reflected from the target object is evaluated in at least two receive channels in such a way that different locus resolutions and different dimensions with respect to distance and length of the virtual barrier are achieved.

In a first receive channel, the received signal for the acquisition of the distance of the target objects is processed using a reference signal having a fixedly set pulse duration $\tau_s$, corresponding to the transmission signal. In a second receive channel, the receive signal may be advantageously processed using a reference signal having a modifiable pulse duration $\tau_R$, either for the measurement of the distance with a modifiable locus resolution or for setting the length $\Delta x_{VB}$ of the virtual barrier.

The exemplary method according to the present invention may be executed in particularly advantageous fashion as described in the context of the mathematical relationships of FIG. 3.

An exemplary device for performing the exemplary method according to the present invention includes a pulse radar sensor, having in particular a first receive channel for distance measurement and a second receive channel for setting the virtual barrier in the sense previously described.

The adaptive setting of the length $\Delta x_{VB} \approx \Delta x_{mess}$ of the virtual barrier enables, in a relatively simple manner, an optimization of the value for $\Delta x_{mess}$ with respect to measurement precision, locus resolution, and the signal/noise ratio. Given a high velocity relative to the vehicle, target objects having a low reflection cross-section are recognized, because in this case a greater value is used for the length of the virtual barrier.

The setting of a distance of the virtual barrier to the radar sensor that is as small as possible, with as low a value as possible for the length $\Delta x_{VB}$ may have the following advantages over larger values for the distance:

If the vehicle and the target object move past one another, the probability that a target object moves through the virtual barrier with a high relative velocity is lower; in this way, false triggerings or false measurements may become less probable.

The signal/noise ratio is larger given a smaller distance of the target object to the radar sensor, and also allows the detection or measurement of target objects having a low reflection cross-section.

In addition, it may also be advantageous that low target objects that are not supposed to be recognized, such as for example curbstone edges, are not acquired by the radar sensor dependent on their height, given lower values for $\Delta x_{VB}$ or $\Delta x_{mess}$, the constructive height of the radar sensor, and the horizontal opening angle of the radar transmission antenna or of the reception antenna.

With the exemplary method according to the present invention, the time of the measurement can advantageously be selected relative to the time of the expected collision of the vehicle with the target object, corresponding to the requirements of the applications.

The various features described herein can respectively be realized individually or in subcombinations.

DETAILED DESCRIPTION

Figure 1:
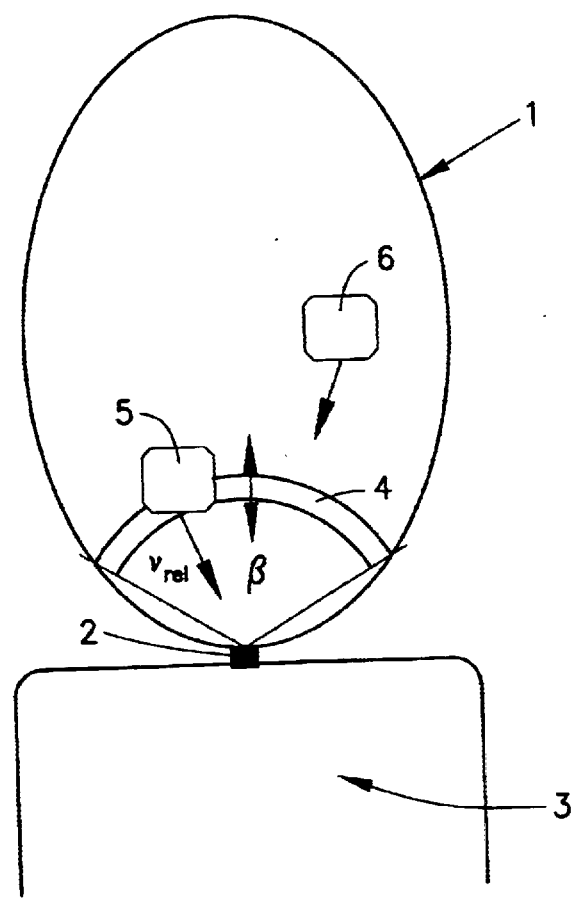
FIG. 1 shows a monitoring area of a radar sensor in the front area of a vehicle, having a virtual barrier for the acquisition and evaluation of a target object.

In FIG. 1, a monitoring area 1 of a radar sensor 2 in the front area of a vehicle 3 is shown graphically, provided with a virtual barrier 4 that is further described on the basis of the following Figures. Radar sensor 2 is present for the acquisition and evaluation of target objects 5 and 6 (here indicated only as examples) in monitoring area 1 with respect to their distance from vehicle 3, and in particular also with respect to their relative velocity $v_{rel}$ or $v'_{rel}$ to vehicle 3.

According to the exemplary method for evaluating monitoring area 1, a virtual barrier 4, which can be controlled adaptively in the direction indicated with an arrow, is set up that is provided with a suitable distance from radar sensor 2, and in which distance range $x_{mess}$ that is to be measured can be acquired. Here, virtual barrier 4 represents a subarea of monitoring area 1, and can already be realized with the aid of an individual radar sensor 2 having horizontal opening angle $\beta$.

Figure 2:
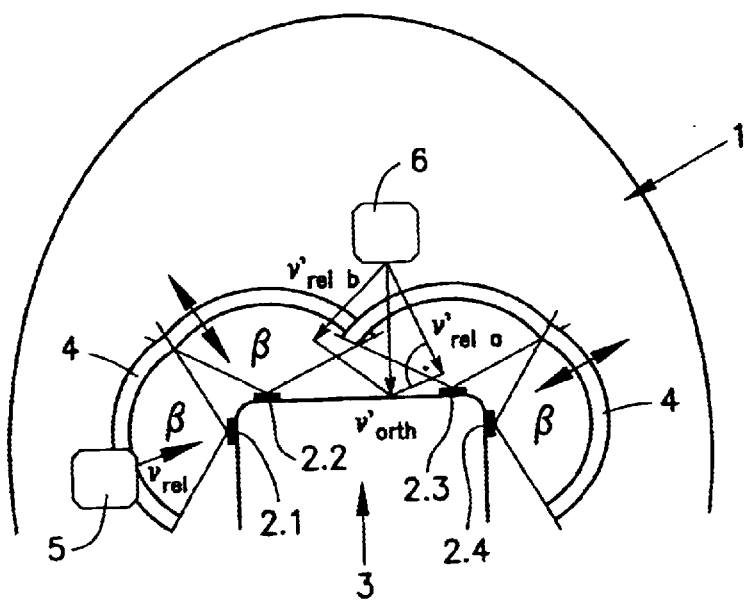
FIG. 2 shows a monitoring area of a plurality of radar sensors on a vehicle, having a virtual barrier corresponding to FIG. 1.

In a modification of the drawing according to FIG. 1, in FIG. 2 a multiplicity of radar sensors 2.1, 2.2, 2.3, and 2.4 are arranged in the front area of vehicle 3 and also laterally. Here, it can be seen that in particular target object 6 is acquired by radar sensor 2.2 with a relative velocity $v'_{rel/b}$, and is acquired by radar sensor 2.3 with a relative velocity $v'_{rel/a}$. At the front of vehicle 3, there thus results an orthogonal relative velocity $v'_{orth}$.

Figure 3:
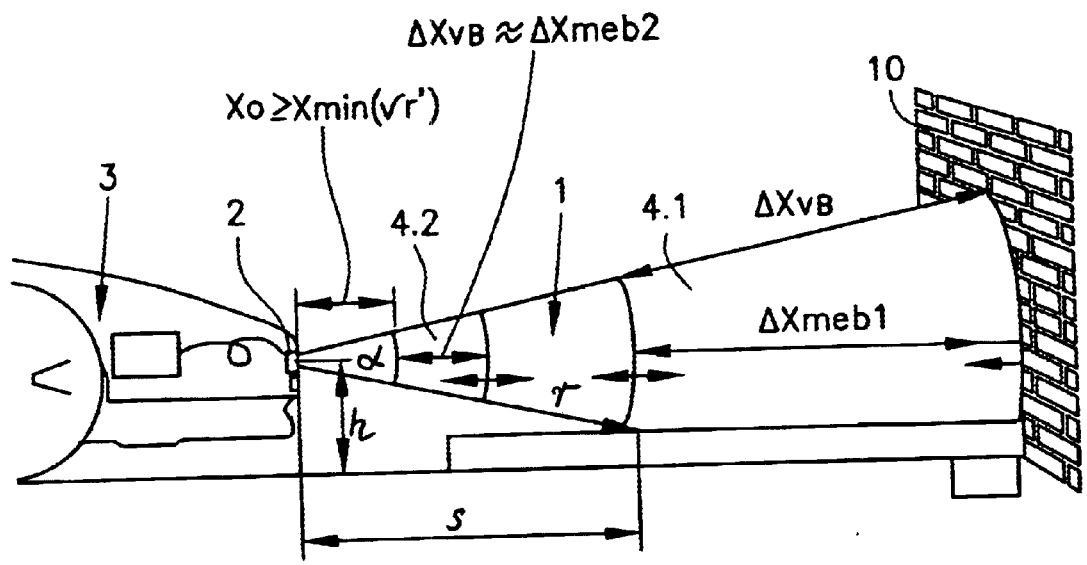
FIG. 3 shows the monitoring area according to the previous Figures, in a lateral section.

On the basis of FIG. 3, in a lateral representation of monitoring area 1 it is shown that adaptively controllable virtual barrier 4 can be set up so that for particular situations it is provided with a suitable distance to radar sensor 2 and with a suitable length $x_{mess}$. For example, a virtual barrier 4.1 is shown for a high velocity in the more distant area for the measurement of the distance within $\Delta x_{mess1}$, and a virtual barrier 4.2 is shown for a relatively low velocity in the closer area, for the measurement of the distance within $\Delta x_{mess2}$.

The determination of the spatial dimensions of virtual barriers 4.1 or 4.2, and the sequence of the measurement processes for the distance and the velocity, may be carried out or performed in the following exemplary method:

a) First, given the presence of target objects (here, for example, wall 10), distance measurements are carried out in monitoring area 1. From the values for the target distances, relative velocity $v'_{rel}$, and, if warranted, acceleration $a'_{rel}$ of vehicle 3 relative to the respective target object is determined.

b) Subsequently, a time interval $t_0$ is defined that may be necessary for the realization of a signal processing on the basis of the measurement values, a data transmission, and a controlling of the relevant applications in the motor vehicle (for example, the changeover of the safety stages in the airbag, the triggering of the seat-belt tensioners, etc.). Time interval $t_0$ can here also be defined as a function of relative velocity $v'_{rel}$ and/or of acceleration $a'_{rel}$.

c) On the basis of the previously determined values, the minimum required distance $x_{min}$ of virtual barrier 4.1 or 4.2 from radar sensor 2 can now be determined according to the following equation:

$$x_{min} = v'_{rel} * t_0 + a'_{rel} * t_0^2 / 2 \tag{1}$$

The distance $X_0$ of virtual barrier 4.1 or 4.2 from radar sensor 2 is selected such that this distance does not fall below the value of $x_{min}$.

d) Given a reduction in the distance between vehicle 3 and target object 10, the instantaneous target distance is compared with the value of the sum $x_{min} + \Delta x_{mess}$. If the instantaneous distance to target 10 is smaller than $x_{min} + \Delta x_{mess}$, there takes place here a velocity acquisition through a measurement of the Doppler frequency $f_d$ inside virtual barrier 4.1 or 4.2, with a measurement time $t_{mess}$. The length $\Delta x_{VB}$ of virtual barrier 4.1 or 4.2 is then approximated to the value from the following equation:

$$\Delta x_{VB} \approx \Delta x_{mess} = v'_{rel} * t_{mess} + a'_{rel} * t_{mess}^2 / 2 \tag{2}$$

Measurement time $t_{mess}$ may be a function of relative velocity $v'_{rel}$ and/or of acceleration $a'_{rel}$.

e) The determination of the relative velocity with the aid of Doppler frequency $f_d$ follows from the known equation:

$$f_d = f_0 * 2 v_{rel} / (c - v_{rel}) \tag{3}$$

Where:

c=the velocity of light in the relevant medium, $f_0$=the oscillator frequency, and $v_{rel}$=the relative velocity between the sensor and target object.

Derived from this, the relative velocity can be calculated according to the following equation:

$$v_{rel}=f_d*c/(f_d+2*f_0) \qquad (4).$$

f) In particular if the preceding calculations yield the result that $v_{rel} \neq v'_{rel}$, (cf. target objects 5 and 6 in FIG. 1), steps c) to e) can be repeated with values correspondingly adapted to $v_{rel}$, for the distance range $\Delta x_{VB} \approx \Delta x_{mess}$ and for $x_{min}$. In this way, one can obtain a second value, based on the measurement of Doppler frequency $f_d$, for relative velocity $v_{rel2}$, which if necessary can be used in place of first measurement value $v_{rel1}$. From the two values for the relative velocity, acceleration $a_{rel}$ can then also be calculated if necessary. An expansion of the exemplary method with n-fold repetition of steps a) to e) and subsequent evaluation of measurement values $v_{rel1}$ to $v_{reln}$ may also be done.

g) If relative accelerations $a_{rel}$ or $a'_{rel}$ have been measured, it is possible to calculate more precisely velocity $v_c$ for the time of the collision, using the relationships of:

$$v_c=v_{rel}+a_{rel}*t_{mess} \qquad (5), \text{ or}$$

$$v_c=v_{rel}+a'_{rel}*t_{mess} \qquad (6),$$

Otherwise, $v_c=v_{rel}$ holds here as well.

As an alternative to method step a), the determination of relative velocity $v'_{rel}$ and, if necessary, $a'_{rel}$ can also take place using a cyclical monitoring of a virtual barrier 4.1 or 4.2, which takes place on the basis of the following equations (1) and (2), with the values of:

$$x_{min}=v'_{rel\,max}*t_0+a'_{rel\,max}*t_0^2/2 \qquad (1.1), \text{ and}$$

$$\Delta x_{VB} \approx \Delta x_{mess}=v'_{rel\,max}*t_{mess}+a'_{rel\,max}*t_{mess}^2/2 \qquad (2.1).$$

Here, values $v'_{rel\,max}$ and $a'_{rel\,max}$ are maximum values, that is, what are known as measurement range end values for the relative velocity and the relative acceleration between vehicle 3 and target object 10. If a target object 10 is recognized within this virtual barrier, the further sequence of the measurement method then takes place corresponding to steps b) to g); i.e., an additional measurement takes place within a newly dimensioned virtual barrier 4.1 or 4.2.

Given an increase of the value for $\Delta x_{mess}$, a more precise measurement of the relative velocity and acceleration can be carried out with a greater signal/noise ratio, in particular at targets having high velocity and a low reflection cross-section. However, a value that is as small as possible for $\Delta x_{mess}$ is necessary in order to obtain the highest possible locus resolution. Consequently, the value for Δxmess is a compromise between various, possibly opposed, requirements.

Figure 4:
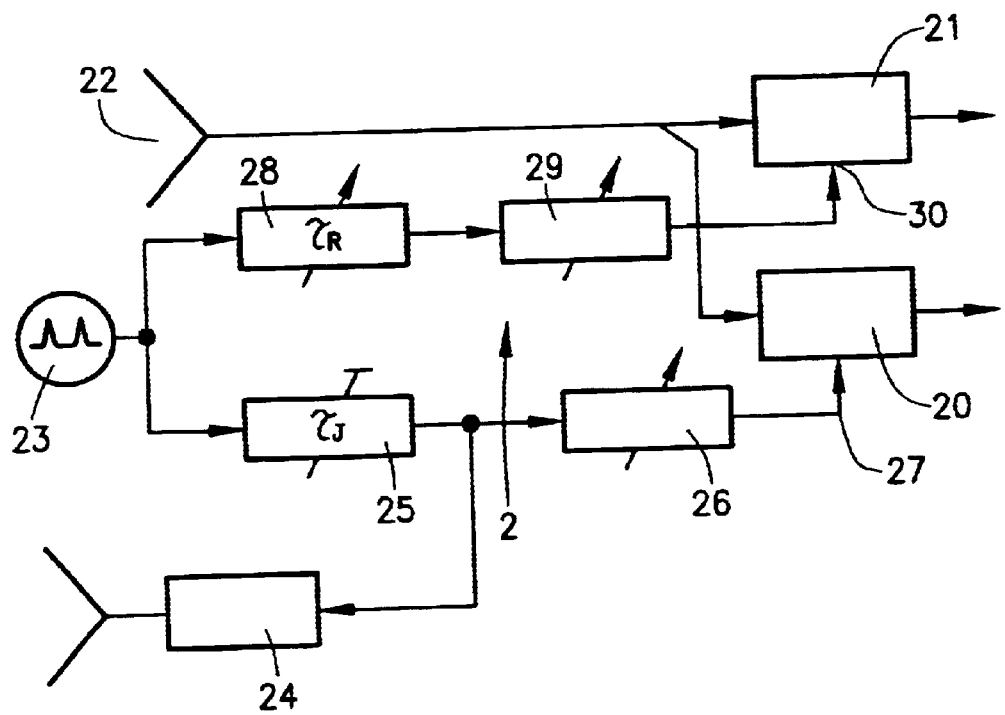
FIG. 4 shows a block switching diagram of a pulse radar sensor with which the adaptive setting of the virtual barrier can be executed.

An exemplary embodiment of a circuit system for the construction of a radar sensor 2 with which an adaptive measurement method using the previously described method is explained on the basis of the block switching diagram according to FIG. 4. Although a pulse radar system is assumed in the following description of an exemplary embodiment, the exemplary method according to the present invention can also be performed using an FMCW radar system.

Given a pulse radar system, the modification of the length of virtual barrier 4, 4.1, or 4.2 may take place, for example, through a modification of the pulse duration or burst duration of the transmitted signal, and/or of the pulse duration of the reference signal used for cross-correlation (mixing) with the received signal. In contrast, given a pulse radar system, the position of virtual barrier 4, or 4.1 or 4.2, can be set through time-delaying of the reference signal in relation to the transmitted signal.

In the block switching diagram according to FIG. 4, two receive channels 20 and 21, having an antenna 22, or also having a second antenna (not shown) for channel 21, are present. A pulse generator 23 is provided that supplies the pulse carrier for the radar signal, which is produced by an oscillator as a radar transmitter 24.

In a branch for first receive channel 20, a first pulse duration adjustment unit 25 is present for pulse duration $\tau_s$, with which the signal transmitted by radar transmitter 24 is also charged. The pulse signal adjusted in this way at the output of pulse duration adjustment unit 25 is routed to a pulse input 27 of first receive channel 20, via a delay unit 26, as a reference signal for the distance measurement of target objects 5, 6, or 10. Pulse duration $\tau_s$ in first receive channel 20 is thus set to a constant value, and corresponds to the pulse duration of the signal of radar transmitter 24. In this way, a maximum is obtained for the signal/noise ratio (S/N), through which this receive channel 20 is used for the distance measurement with a high locus resolution.

In a second branch, behind pulse generator 23, there is a pulse duration adjustment unit 28, which can be modified in continuous fashion or in discrete fashion, for pulse duration $\tau_R$, and subsequent to this a delay unit 29 is also present, this pulse signal being routed to a pulse input 30 of second receive channel 21 as a reference signal for the setting of the length and position of virtual barrier 4, 4.1, or 4.2. Thus, using pulse duration adjustment unit 28, pulse duration $\tau_R$ can be adjusted in second receive channel 21, through which measure this channel 21 is also used for the measurement of the relative velocity between vehicle 3 and target objects 5, 6, or 10 within an adaptively modifiable virtual barrier 4, 4.1, 4.2.

Both receive channels 20 and 21 thus also permit a mutually independent adjustment of the delay for the respective pulse of the reference signal at inputs 27 and 30 of the two receive channels 20 and 21. The different values for $\tau_R$ and $\tau_s$ effect in second receive channel 21 a reduction of the signal/noise ratio S/N, which can be tolerated in particular for a measurement of the relative velocity at close range (virtual barrier 4.2 according to FIG. 3).

The demodulation of the pulse radar signals in receive channels 20 and 21 takes place using mixing techniques by which an I signal and a Q signal of an I/Q mixer (In phase-Quadrat-Mixer, "In-phase-Quadrature-phase (Square) Mixer") is produced for further processing. Here, each receive channel 20 or 21 can contain both signals (I and Q) or only one signal (I or Q). For a cross-correlation in the mixer of receive channel 21, as previously mentioned, pulse duration $\tau_R$ is used. The length $\Delta x_{VB}$ of virtual barrier 4, 4.1, 4.2 is thus calculated as:

$$\Delta x_{VB}=(\tau_R+\tau_s)c/2 \qquad (7).$$

According to the exemplary embodiment and/or exemplary method of the present invention, this length $\Delta x_{VB}$ is adjusted through a corresponding modification of pulse duration $\tau_R$ of the reference signal at input 30 of second receive channel 21. Because $\tau_s$ is constant, the measurement in first receive channel 20 is not influenced.

The exemplary embodiments and exemplary methods described herein may be modified, in particular with respect to the number of receive channels or receive branches and of the receiver modules used in common or separately. A combination, of sequential and parallel evaluation of distance and velocity in one or more receive channels may also be provided in the context of the subject matter of the claims.

What is claimed is:

1. A method for detecting and evaluating at least one target object in an area surrounding a vehicle, comprising:
   (a) acquiring the at least one target object in a monitoring area by using at least one radar sensor, and
   (b) evaluating at least one of distance data and velocity data of the at least one target object in at least one evaluation arrangement;
      wherein the velocity data of the at least one target object is acquired within a virtual barrier that is modifiable in a first distance of the virtual barrier from the vehicle and in a length of the virtual barrier.

2. The method of claim 1, wherein a receive signal reflected from the at least one target object is evaluated in at least one receive channel using a transmission signal of a pulse radar sensor to provide at least one of a different locus resolution and a different dimension with respect to the first distance and the length of the virtual barrier.

3. The method of claim 2, wherein:
   a first receive channel is arranged to process the receive signal, using a first reference signal having a fixedly set pulse duration corresponding to the transmission signal, to at least one of acquire the distance data of at least one target object and set the first distance of the virtual barrier; and
   a second receive channel is arranged to process the receive signal, using a second reference signal having a variable pulse duration, to at least one of adjust the length of the virtual barrier, acquire the at least one target object with a modifiable locus resolution, and acquire the at least one target object in another distance range.

4. The method of claim 1, further comprising:
   (c) acquiring a second distance and a first relative velocity, and, if necessary, a first relative acceleration of the vehicle with respect to the at least one target object;
   (d) predetermining a time interval for measurement value processing, data transmission, and controlling a relevant application;
   (e) determining a minimum distance of the virtual barrier from each of the at least one radar sensor so that the first distance of the virtual barrier does not fall below the minimum distance, and determining the length of the measurement area; and
   (f) acquiring the first relative velocity and the first relative acceleration by measuring a Doppler frequency inside the virtual barrier with a time, if the second distance is smaller than a sum of the minimum distance and the length of the virtual barrier.

5. The method of claim 4, wherein the time interval is a function of at least one of the first relative velocity and the first relative acceleration.

6. The method of claim 4, wherein steps (e) and (f) are repeated multiple times to acquire a plurality of distance ranges and velocity ranges, using each time newly calculated values of the length of the virtual barrier and the minimum distance.

7. The method of claim 4, wherein steps (e) and (t) are repeated with lower values for the length of the virtual barrier and for the minimum distance if a second measured relative velocity is smaller than a first measured relative velocity.

8. The method of claim 4, wherein a collision velocity at a collision time is calculated from relative accelerations of the vehicle with the respect to the at least one target object according to at least one of:

$$v_c = v_{ref} + a_{rel} * t_{mess};  \text{ and}$$

$$v_c = v_{ref} + a'_{rel} * t_{mess}.$$

9. The method of claim 1, further comprising:
   selecting at least one relevant target object for an application; and
   determining relative velocities of at least one selected relevant target object by evaluating a Doppler frequency within a respective virtual barrier in the at least one receive channel, simultaneously with at least another distance measurement in the at least one receive channel used therefor;
   wherein the acquiring includes measuring the distance data of the at least one target object present in the monitoring area using at least one receive channel.

10. The method of claim 1, wherein the evaluating includes evaluating a received radar signal in at least one receive channel by a combination of at least one of a chronologically sequential evaluation and a chronologically parallel evaluation in the at least one receive channel.

11. A device for acquiring and evaluating objects in an area surrounding a vehicle, comprising:
   an acquiring arrangement to acquire at least one target object in a monitoring area; and
   an evaluating arrangement to evaluate at least one of distance data and velocity data of the at least one target object;
   wherein:
      the velocity data of the at least one target object is acquired within a virtual barrier that is modifiable in a first distance from the vehicle and a length of the virtual barrier; and
      the acquiring arrangement includes at least one pulse radar sensor, a first receive channel, at least another receive channel, and a pulse generator, to provide modulated carrier pulses for a signal of a radar transmitter and to provide demodulation in the first receive channel and the at least another receive channel.

12. The device of claim 11, further comprising:
   a first pulse input arrangement;
   a first delay arrangement;
   a first pulse duration adjustment arrangement, associated with the first receive channel, to charge the signal of the radar transmitter for a first pulse duration and route it via the first delay arrangement to the first pulse input arrangement as a first reference signal;
   a second pulse input arrangement;
   a second delay arrangement; and
   a second pulse duration adjustment arrangement, associated with the at least another receive channel, to modify at least one of continuously and discretely the signal for a second pulse duration and route it via the second delay arrangement to the second pulse input arrangement for one of adjusting at least one of the length and the first distance of the virtual barrier, and measuring the first distance with a modifiable locus resolution.

13. The device of claim 12, wherein the first reference signal is for measuring distance.

14. The device of claim 12, wherein the second reference signal is for at least one of adjusting the virtual barrier and measuring distance.

15. The device of claim 11, wherein the device includes an I/Q mixer for mixing a transmission signal and a signal supplied by a reception antenna in a respective receive channel.

16. The device of claim 11, wherein the evaluating of a received radar signal is performed in the first receive channel and the at least another receive channel by a combination of at least one of a chronologically sequential evaluation and a chronologically parallel evaluation therein.

17. The device of claim 11, wherein the first receive channel is for measuring distance.

18. The device of claim 11, wherein the at least another receive channel is for at least one of adjusting the virtual barrier and measuring distance.

19. A device for acquiring and evaluating objects in an area surrounding a vehicle, comprising:
   an acquiring arrangement to acquire at least one target object in a monitoring area; and
   an evaluating arrangement to evaluate at least one of distance data and velocity data of the at least one target object;
   wherein:
      the velocity data of the at least one target object is acquired within a virtual barrier that is modifiable in a first distance from the vehicle and a length of the virtual barrier, and
      the at least one radar sensor includes a FMCW radar system having at least one receive channel.

20. A method for detecting and evaluating at least one target object in an area surrounding a vehicle, comprising:
   (a) acquiring the at least one target object in a monitoring area by using at least one radar sensor; and
   (b) evaluating at least one of distance data and velocity data of the at least one target object in at least one evaluation arrangement;
      wherein the velocity data of the at least one target object is acquired within a virtual barrier, the virtual barrier being at a first distance away from the vehicle and having a length, the first distance and the length of the virtual barrier being modifiable.

21. A device for acquiring and evaluating objects in an area surrounding a vehicle, comprising:
   an acquiring arrangement to acquire at least one target object in a monitoring area; and
   an evaluating arrangement to evaluate at least one of distance data and velocity data of the at least one target object;
   wherein:
      the velocity data of the at least one target object is acquired within a virtual barrier, the virtual barrier being at a first distance away from the vehicle and having a length, the first distance and the length of the virtual barrier being modifiable; and
      the acquiring arrangement includes at least one pulse radar sensor, a first receive channel, at least another receive channel, and a pulse generator, to provide modulated carrier pulses for a signal of a radar transmitter and to provide demodulation in the first receive channel and the at least another receive channel.

22. A device for acquiring and evaluating objects in an area surrounding a vehicle, comprising:
   an acquiring arrangement to acquire at least one target object in a monitoring area; and
   an evaluating arrangement to evaluate at least one of distance data and velocity data of the at least one target object;
   wherein:
      the velocity data of the at least one target object is acquired within a virtual barrier, the virtual barrier being at a first distance away from the vehicle and having a length, the first distance and the length of the virtual barrier being modifiable; and
      the at least one radar sensor includes a FMCW radar system having at least one receive channel.

* * * * *

UNITED STATES PATENT AND TRADEMARK OFFICE
CERTIFICATE OF CORRECTION

PATENT NO. : 6,611,759 B2
DATED : August 26, 2003
INVENTOR(S) : Thomas Brosche

It is certified that error appears in the above-identified patent and that said Letters Patent is hereby corrected as shown below:

Column 5,
Line 54, change "Δxmess" to -- $\Delta x_{mess}$ --.

Column 7,
Line 63, change "(t)" to -- (f) --.

Signed and Sealed this

Seventeenth Day of August, 2004

JON W. DUDAS
*Acting Director of the United States Patent and Trademark Office*